United States Patent [19]

Moore et al.

[11] Patent Number: 4,952,672

[45] Date of Patent: Aug. 28, 1990

[54] METHOD FOR THE DEVOLATILIZATION OF THERMOPLASTIC MATERIALS

[75] Inventors: Eugene R. Moore; Robert A. Hay, II, both of Midland, Mich.

[73] Assignee: The Dow Chemical Company, Midland, Mich.

[21] Appl. No.: 152,264

[22] Filed: Aug. 11, 1988

[51] Int. Cl.⁵ .............................................. C08F 6/00
[52] U.S. Cl. ................................. 528/481; 528/501; 528/502; 159/6.1; 159/49; 264/102; 264/344
[58] Field of Search ............... 528/502, 481, , 501; 264/102, 311, 344; 159/6.1; 523/342

[56] References Cited

U.S. PATENT DOCUMENTS

| | | | |
|---|---|---|---|
| 158,764 | 1/1875 | Wendel et al. | 528/502 X |
| 2,734,023 | 5/1953 | Hickman | 202/64 |
| 3,098,718 | 7/1963 | Ferrari | 23/253 |
| 3,266,085 | 8/1966 | Nacke | 18/2.6 |
| 3,371,059 | 2/1968 | Rich | 260/29.6 |
| 3,409,712 | 11/1968 | Chisholm | 264/176 |
| 3,424,832 | 1/1969 | Chisholm | 264/143 |
| 3,442,317 | 5/1969 | Wieland | 159/48 |
| 3,879,327 | 4/1975 | Burke, Jr. | 523/328 |
| 3,974,023 | 8/1976 | Bowers | 159/49 |
| 4,315,843 | 2/1982 | Vidotto et al. | 260/29.6 PT |

OTHER PUBLICATIONS

Chem. Eng. Hndbk., J.H. Perry (ed.) 3rd ed., McGraw-Hill Co., Inc., N.Y., 1950, 657.

Primary Examiner—Joseph L. Schofer
Assistant Examiner—F. M. Teskin

[57] ABSTRACT

This invention is a method and an apparatus for rapidly devolatilizing a product of a polymerization process containing at least one volatile material. The product is initially devolatilized in a high temperature zone, and the foamed devolatilized product is separated into a gas and a liquid polymer phase and rapidly removed therefrom to minimize depolymerization and degradation of the polymer. The partially devolatilized product is further devolatilized by feeding it into a rotatable chamber which is rotated at a sufficient angular velocity to create a high gravitational field to form a vapor and a polymer liquid pool.

10 Claims, 2 Drawing Sheets

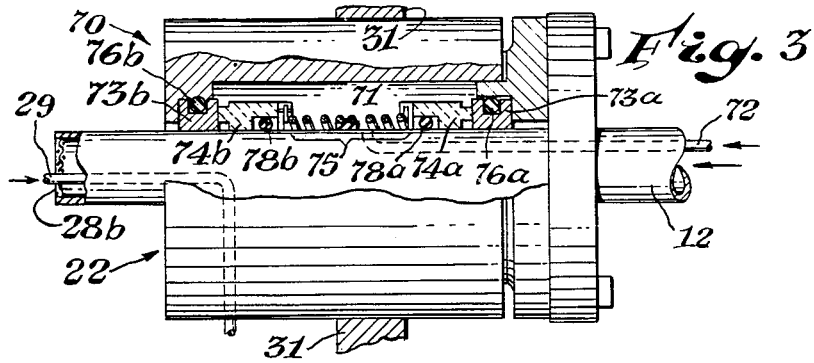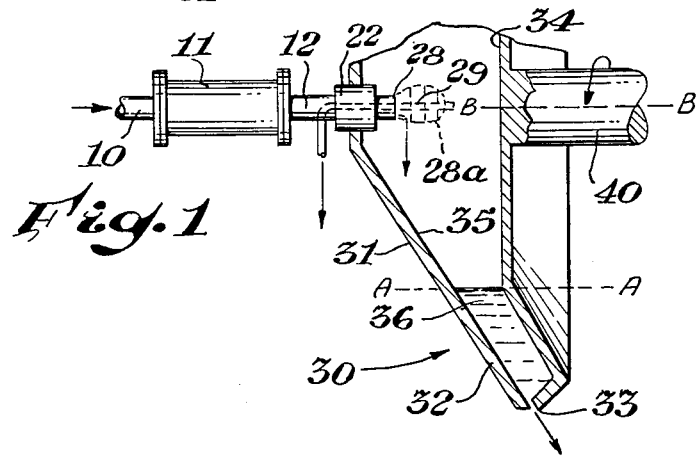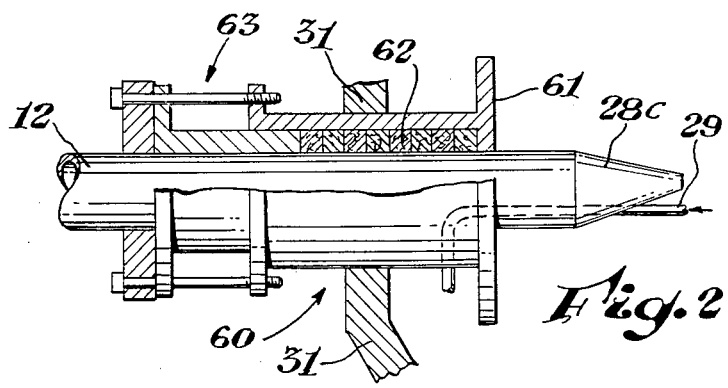

METHOD FOR THE DEVOLATILIZATION OF THERMOPLASTIC MATERIALS

FIELD OF THE INVENTION

This invention relates to an improved method for the devolatilization of the product of a polymerization process containing at least one devolatilization material. More particularly this invention relates to a method and apparatus for concentrating solids-containing fluids which are heat sensitive.

BACKGROUND OF THE INVENTION

A particular problem exists in the production of polymer with removing residual unpolymerized monomer or solvent. Heating to the vaporization temperature of the monomer or solvent results in a gradual dissipation of the monomer over an extended period. An increase in temperature increases the monomer or solvent removal rate, unfortunately the rate of monomer generation also increases with temperature. However, as currently practiced, not only do long residence times increase costs of commercial products, but also result in physical property deterioration of the polymer and undesirably high amounts of residual monomer remain even after many hours. Residual monomers have many deleterious effects on a polymer. For example, they lower the strength characteristics, produce internal bubbles, may impart undesireable taste and odor to food materials in contact therewith, and reduce resistance to environmental conditions.

Thermoplastics are prepared by the polymerization of a suitable monomer or mixture of monomers, generally in the presence of a volatile liquid media. The initial product is produced in a solution, mass, emulsion, or suspension from which it is necessary to isolate the thermoplastic polymer from its unpolymerized monomer and solvent.

In particular, a wide variety of methods and apparatus have been employed to remove small amounts of volatile material from synthetic thermoplastic resins. However, many synthetic resinous thermoplastic materials are heat sensitive and tend to degrade on exposure to elevated temperatures. Thus in many instances, it is highly desirable to perform an operation upon the thermoplastic composition in such a manner that the composition is held at an elevated temperature for only a minimum length of time. Conventional devolatilization procedures are often undesirable.

Conventional devolatilizers are generally based upon a gravity feed system, i.e., typically the polymer will pass through a heat exchanger into a vacuum chamber and in so doing the volatile will essentially be removed from the polymer. The volatile-free polymer then falls under the force of gravity toward a pumping device which has the capability of removing the polymer from the vacuum chamber.

The gravity feed system, while providing satifactory results, has a limitation in that there is no flow control of the polymer. Consequently, the polymer may become hung up on the devolatilizer walls or may become trapped in stagnant or recirculating pools. In either instance, certain quantities of the polymer may be in the devolatilizer for a length of time sufficient to cause polymer degradation.

Attempts to correct this by varying the devolatilization temperature have not proven successful. If low temperatures are employed, the length of time the polymer spends in the chamber is excessive due to the relatively high viscosity of the polymer. The relatively high polymer viscosity causes the rate of polymer removal from the devolatilizer to be too slow for practical operation; further, due to reduced vapor pressure, the amount of volatile removal is substantially decreased. If high temperatures are employed, undesired degradation of the polymer results, which is generally in proportion to the temperature of processing and the length of time the polymer has been held at the elevated temperature. Substantial and significant difficulties arise with such heat sensitive polymers in that retention of small portions of a thermally degradable plastics composition often results in severe local decomposition and can result in black spots of charred resin which can render a mass of polymer totally unsuitable for the preparation of thin transparent film. Additionally at relatively high temperatures, although an increased volatility of the monomer causes an initial lowering of monomer content at the entrance of the devolatilizer, the monomer regeneration rate becomes so great that during the even shorter residence time the total amount of volatiles in the polymer is increased.

It would be desirable if there were available an improved method for the devolatilization of synthetic resinous materials which are readily thermally degraded.

It would also be beneficial if there were available an improved method for the devolatilization of thermally degradable synthetic resinous materials which material is produced into articles such as films, wherein the articles had been subjected to a minimal heat history.

A still further object of this invention is to provide a method which does not alter the chemical-physical properties of the resulting thermoplastic.

Another object of this invention is to provide an apparatus for the devolatilization of synthetic resinous materials which are readily thermally degraded.

Other and further objects of the invention will be apparent from the following description and claims and may be understood by reference to the accompanying drawings, which by way of illustration show preferred embodiments of the invention. Other embodiments of the invention may be used without departing from the scope of the present invention as set forth in the appended claims.

SUMMARY OF THE INVENTION

In an important aspect, the present invention takes the form of a method for the devolatilization of the product of a polymerization process containing at least one volatile material, the steps of the method comprising (a) feeding said product into a heated zone: (b) heating said product in a temperature range sufficient to volatilize the volatile material and assure liquidity of the product, whereby a substantial portion of the volatile material is placed in the vapor phase and the remainder of the volatile material becomes entrapped in the product in a liquid or gas form to form a partially devolatilized product: (c) passing the partially devolatilized product into a rotatable chamber, said chamber having an inlet and means for the rotation: (d) rotating the rotatable chamber at an angular velocity to create a centrifugal force sufficient to move the partially devolatilized product along the inner surface of the rotatable chamber, thereby releasing a substantial amount of the volatile from the product to form a volatile vapor and a polymer liquid, and (e) removing the separated polymer liquid by means for withdrawing the polymer.

In another embodiment, the invention takes the form of an apparatus for the devolatilization of the product of a polymerization process containing at least one volatile material, the apparatus comprising: (a) first devolatilizing means comprising in cooperative combination a heatable chamber having heating means, said heatable chamber having an inlet and an outlet: (b) a conduit means in fluid communication with the outlet of the heatable chamber: (c) second devolatilizing means comprising in cooperative combination (1) a rotary seal having the feed means being engaged therein: (2) a rotatable chamber comprising an inlet, said chamber inlet being rotatably affixed to rotary seal and being in fluid communication with the conduit means: and (3) rotating means for selectively rotating the rotatable chamber.

BRIEF DESCRIPTION OF THE DRAWINGS

FIG. 1 is a fragmentary, side elevation, partially-insection view of the devolatilizer.

FIG. 2 is a fragmentary, side elevation, partially-insection view of the rotary seal within the devolatilizer.

FIG. 3 is a fragmentary, side elevation, partially-insection view of the rotary seal within the devolatilizer.

DETAILED DESCRIPTION OF THE INVENTION

Figure 4:
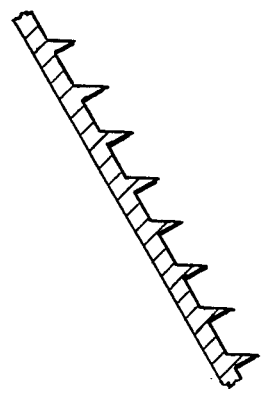
FIG. 4 is a fragmentary, side elevation, partially-insection view of an embodiment of an inner surface of the rotatable chamber.

In the practice of the method of the present invention, it is generally desirable to provide a volatile-containing product in flowable form, as a concentrated solution such as produced in solution or mass polymerization. in some cases this would apply to a flowable emulsion. Alternatively, the volatile-containing product may be in the form of beads as obtained directly from a suspension polymerization or in the form of a dried coagulant obtained when a latex is coagulated. In the above case, an extruder could typically be used to supply the flowable resin.

The term "volatile-containing product" is used herein to designate resinous materials in intimate mixtures: e.g., true solutions and also dispersions or emulsions: with volatile materials in liquid or gaseous form. Generally, the resinous materials will be the continuous phase and the volatile materials will be the discontinuous phase.

The method and apparatus of the present invention are applied with particular benefit to such readily thermally degradable materials as realtivley rigid polymers of monovinylidene aromatic resins such as styrene, resinous copolymers thereof such as styrene-acrylonitrile styrene-methylacrylate, and styrene-maleic anhydride, styrene/maleimide or alpha methyl styrene-acrylonitrile copolymers and polyolefins such as polyethylene, polypropylene, polycarbonates, vinylidene chloride copolymers, polyphenylene oxides, and the like, and the resinous copolymers and blends thereof.

To improve the impact resistance of the relatively rigid polymers described above, the relatively rigid polymers may have graftable rubber substrates dispersed therein. Suitable rubbery substrate polymers include any polymer or copolymer which are selected to have a glass transition temperature (Tg) of less than about 0° C., preferably not higher than −20° C. as determined by American Society of Testing and Materials (ASTM) test Method D 746-52T.

Graftable rubber substrates suitable for use in the first phase of the present invention may be formed from various elastomeric materials. The elastomeric materials preferred for use in the present invention are diene rubbers, acrylate rubbers, ethylene propylene rubbers, hydrogenated diene rubbers, and EPDM rubbers, or mixtures thereof. A diene rubber is any rubbery polymer of one or more conjugated 1,3-diene, e.g., butadiene, isoprene, piperylene, chloroprene, etc. An acrylate rubber is any rubbery polymer of one or more acrylate monomers, e.g., 2-ethylhexyl acrylate, butylacrylate, etc. An EPDM rubber is an interpolymer formed from ethylene, propylene and one or more dienes.

Techniques for dispersing the graftable rubber substrates are well known in the art. The *Kirk-Othmer Encyclopedia of Chemical Technology*, 3rd edition, (1980), which is hereby ted by reference, sets forth general polymerization methods.

Any medium which can be volatilized may be removed from intimate mixture with a thermoplastic by the process of this invention. Suitable mediums include, in gaseous or liquid form, ethylbenzene, methyl ethylketone, water, tetrachloroethylene, pentane, hexane, cyclohexane, benzene, carbon tetrachloride, tetrahydrofuran, acetone, ethylene, vinyl chloride, vinylidene chloride and the like. The chemical nature of the solvent is not material to the present invention except that it will be apparent to those skilled in the art that equipment employed should be constructed of materials that are not destroyed or chemically attacked by the solvent.

Usually the liquid medium will be the one in which the polymer was obtained, prepared or purified. The medium as defined here can also include unreacted monomers which are not polymerizable under the process conditions: thus solutions of polymers made by bulk polymerization can be treated. Additionally liquid media may be added to the resinous material to provide a stripping action. Typically water, carbon dioxide, or an alcohol such ethanol or methanol would be used. Mixtures of the above-described liquid media can also be employed.

The solids concentration, (i.e., weight of normally solid components per unit weight of solution) suitable for operating this process depends on the nature of the thermoplastic, and the nature of the mixture with liquid. The concentration should preferably be high in order to minimize costs. However, too concentrated a solution or dispersion may be difficult to pump satisfactorily. It will be understood by those skilled in the art that thermoplastic/liquid mixtures in unsuitable form for use in the practice of this invention such as a thick solution can be corrected readily by the addition of further solvent and suitable homogenization. As hereinabove stated, suitable concentrations of polymers vary with process conditions, but in general the solid concentration should be between about 10 to about 99.5 percent by weight of the total weight of the solution. The polymer may be accompanied by other nonvolatile components which do not interfere with the process. Examples of such components are plasticizers, anti-oxidants, and mineral fillers. Those skilled in the art can readily determine by routine experimentation which additives can be tolerated.

A polymerization means (not shown) is provided. Suitable polymerization means include a reactor or a variety of solution tanks for producing a polymeric solution or solutions, blends of polymers in solution, or blends with pigments, fillers, or reinforcement agents. The polymerization means has an outlet to which it is connected with the inlet of a suitable pump (not shown) via an a first conduit means (not shown). By "conduit means" is meant not only the conduit, but also any necessary valves, connecting means, unions and the like. Exemplary pumps include gear pumps, e.g, a variety of intermeshing gear designs and the like: or screw pumps, e.g., single screw, double screw, intermeshing, nonintermeshing and the like. An outlet line 10 from the pump to a heatable zone may include an automatic flow-control valve (not shown), particularly when the mixture has a high solvents content and a centrifugal pump is employed.

The heatable zone can be any type of tube having an inlet and an outlet and which is heatable by any conventional heating means 11, such as by steam pipes or by at least one electric heater. A preferred heating means includes the well-known tube-and-shell type which uses steam or other condensate vapor to heat.

The outlet line 10 of the heat exchanger is in fluid communication with the interior of a rotatable chamber 30 via inlet line 12 to the rotatable chamber.

The rotatable chamber is fixedly attached to and revolves around the inlet line 12 by a fluid-tight rotary seal 22. The rotary seal may be a simple packed seal, as seen in FIG. 2, or a double mechanical seal, as seen in FIG. 3.

As seen in FIG. 2, the simple packed seal 60 comprises a rotating packing support 61 rotatably affixed along the major axis of inlet line 12 to the rotatable chamber. A series of rings of soft packing 62 are compressed against the shaft to provide a vacuum seal by a rotating packing follower 63.

As seen in FIG. 3, the double mechanical seal 70 comprises a pressurized oil chamber 71 rotably affixed along the major axis of inlet line 12 to the rotatable chamber. The oil chamber 71 is pressurized through a suitable oil feed conduit 72. The oil chamber 71 has replaceable rotating seals 73a and 73b affixed at each axial end. The faces of the replacable rotating seals are in contact on the rotary seal shaft with faces of replaceable stationary seals 74a and 74b, respectively, which are sealed to the pressurized oil chamber by soft seals 76a and 76b. The stationary seals 74a and 74b are held in place by a compressed spring 75 and sealed to the shaft by soft seals 78a and 78b, respectively. The rotating vacuum chamber 77 is affixed to the rotating seal. The double mechanical seal is most preferred because, with pressurized liquid between the two seals, oil pressure is maintained at a greater pressure than ambient pressure. Consequently, polymeric solution does not have an opportunity to contaminate the seal area and cause excessive wear.

The operation of the rotatable chamber 30 is achieved by rotating means. Exemplary rotating means include a drive shaft 40 and a motor (not shown) in cooperative combination. In such an embodiment, the drive shaft is centrally mounted to the rotatable chamber.

Although the chamber may be of any configuration, it will preferably be symmetrical, to provide smooth, balanced rotation. In an exemplary configuration, the chamber may take the form of a flat disc, bell, or cone.

The chamber has an inlet, said chamber inlet being rotatably affixed to the rotary seal 22 and, with the second conduit means, providing fluid communication with the heatable chamber. Preferably, the inlet will be centrally disposed to allow for an equal, radially extending centrifugal force to be produced by the chamber.

Advantageously the inlet to the rotatable chamber may be in cooperative combination and fluid communication with a volatile separating means 28. Preferably, the volatile separating means 28 will be located at the opening of the second conduit means into the chamber. Suitable volatile separating means 28 include mesh cages or guides 28a and 28b, which are shown partially in section in FIGS. 1 and 2 respectively: or jet means 28c, shown in FIG. 3. The jet means 28c propel the foam against an inner surface of the chamber, e.g., distal inner surface 34. Exemplary jet means 28c may include nozzles or the like.

The chamber may advantageously be constructed to improve maximize the flow surface of proximal inner surface 35 of the rotatable chamber. Proximal inner surface 35 may comprise a radially extending, outwardly angling, generally planar surface from the inlet pipe 12.

Figure 5:
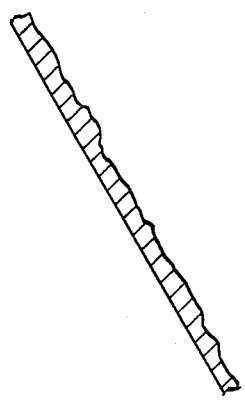
FIG. 5 is a fragmentary, side elevation, partially-insection view of an embodiment of an inner surface of the rotatable chamber.

Proximal inner surface 35 of the rotatable chamber may be of a configuration to provide mixing and or flow disturbance. For example, various types of surfaces may be employed. Thus, FIG. 4 depicts a stepped surface: FIG. 5 depicts a textured surface. However, it is to be understood that the previous embodiments were for example only, and any surface which provides mixing and or flow disturbance may be employed. Moreover, if jet means, as described above, are utilized to propel polymer against chamber surface 34, surface 34 may also be of a configuration to provide mixing and or flow disturbance.

The rotatable chamber is heated by heating means and/or by the temperature of the molten polymer. Suitable heating may be obtained by radiation, convection, or conduction. Suitable heating means may include heat lamps, eddy-current heaters, e.g., setting up a magnetic field about the rotatable chamber which acts as an electric brake to convert the rotational kinetic energy of the chamber into heat; electrical heaters, e.g. electric heaters on the rotatable chamber being attached to commutators: and heat transfer vapor or fluid systems, e.g, piped through an additional rotating seal system.

The rotatable chamber 30 may beneficially define continuous subchambers. The periphery of the rotatable chamber 30 defines a relatively narrow, peripheral annular subchamber 32 continuous with vapor disentrainment subchamber 31, demarcated by horizontal line A—A.

The peripheral annular subchamber 32 generally will be of a depth relative to a fixed-geometry polymer discharge means to provide a sufficient pressure head to readily discharge polymer through polymer discharge means. Suitable embodiments of the polymer discharge means comprise an aperture or apertures 33. The flow through the fixed-geometry polymer discharge means, will cause a pressure drop, which must be balanced by the centrifugal force of the liquid head in peripheral annular subchamber 32.

The collected gases are discharged through vapor discharge means (not shown). The vapor is advantageously removed by evacuation means. The vapor discharge means conveniently may comprise a steam jet evacuation apparatus (not shown) or a vacuum pump (not shown) connected to a vapor discharge tube 29 extend from within and exit on the exterior of the shell to draw the non-condensed material from the rotatable chamber. For convenience, the vapor discharge tube 29 should exit through an essentially nonrotating portion of the rotatable chamber. A suitable condenser (not shown) would usually be placed before the evauation means. The vapor discharge tube 29 generally will be either within the feed means or adjacent the feed means in the rotating seal. Alternatively, when the drive shaft 40 is hollow it would also be possible to insert the vapor discharge tube 29 in the drive shaft and provide an additional rotating seal at the distal end of the seal relative to the rotatable chamber.

Volatile discharge may be effected by a volatile discharge means which may comprise, for example, a generally stationary tube and an evacuation means having an inlet, said tube being in vapor communication with the chamber and the inlet of the evacuation means. Any conventional evacuation means is suitable, such as a steam jet evacuation apparatus or a vacuum pump.

The polymer may then collected from the rotating chamber in holding means (not shown). Exemplary holding means may include allowing strands of polymer to extrude through aperture(s) 33, cutting the strands by impingement on a stationary knife and, and cooling the pellets with a water spray. The stationary knife is desireably shifted to prevent localized wear. The granules are separated from the cooling water, and further dried.

In the operation of this invention, a product of a polymerization process containing at least one devolatilization material is fed into the heated zone. The product is heated at a temperature sufficient to volatilize at least a portion, preferably most all, of the volatile and to assure liquidity of the partially devolatilized product. The remainder of the volatile material becomes entrapped in the product in a liquid or preferably gas form.

The partially devolatilized product is then introduced into a rotatable chamber through inlet line 12, which is stationary inlet. The devolatilizing apparatus of the present invention may be employed in a batch process or, preferably, may be a continous process. In the latter instance, the partially devolatilized product is continuously fed into the rotatable chamber and the separated polymer liquid is removed from the chamber at a rate generally equal to the rate of feed into the chamber.

The partially devolatilized product will beneficially be sheared by volatile separating means 28 prior to being deposited in the chamber. The mesh cages or guides 28B shear the volatile-containing product as it is passed through the cages: the mesh cages are particulary useful when the volatile-containing product is in the form of a foam, which is at least partially collapsed as it is passed through the cages.

The rotatable chamber is rotated about the axis B—B at a suitable angular velocity to move the remaining partially devolatilized product against the chamber surface. The rotatable chamber will be rotated at an angular velocity to create a centrifugal force sufficient to move the partially devolatilized product along the inner surface of the rotatable chamber which is proximal to the inlet line 12, proximal inner surface 35.

A consideration in selecting the rate of angular velocity of rotation of the rotatable chamber is to select a rate which will form the partially devolatilized product into a relatively thin film, whereby the remaining volatiles will readily separate from the polymer liquid.

By maximizing the flow surface of proximal surface 35, as described above, on which the partially devolatilized product is pulled, a thinner film will be and devolatilization of the partially devolatilized product will be enhanced. By moving the partially devolatilized product along the proximal inner surface 35, thereby releasing a substantial amount of the volatile from the product to form a volatile vapor and a polymer liquid, which is substantially free of volatiles.

As stated previously, rotatable chamber 30 may beneficially define continuous subchambers. The chamber thus constructed improves the collection of the separated components separated by centrifugal force, and discharge of devolatilized polymer. For example, a central, vapor disentrainment subchamber 31 should be of a volume sufficiently large to hold the less dense material and vapor which is separated and dissipated from the partially devolatilized product.

The rotatable chamber is suitably heated to a temperature sufficient so that the material is able to flow sufficiently to be removed from the chamber by the centrifugal force. Residence time in the rotatable chamber is dependent upon centrifugal force as defined by the configuration and rpm of the rotatable chamber; viscosity of the solution defined by the type of polymer and solvent employed, the polymer concentration in the solvent, molecular weight of the polymer mixture, and the temperature to which the polymer is heated. For a given residence time, the residual monomer level will decrease as the solution temperature is raised, because increased vapor pressure and decreased viscosity enhance the removal rate of the monomer. However, the monomer level in the solution tends to increase when the temperature is further raised beyond a temperature sufficient to cause decomposition of the polymer at a rate faster than the monomer removal rate.

While it is desired that the partially devolatilized product product will be effectively sheared, thereby releasing a substantial amount of the volatiles from the partially devolatilized product and leaving a mixture of a devolatilized polymer liquid and the remainder of the volatile material, it is also of value to simply expel the devolatilized product without allowing time for further decomposition.

An advantage of the present invention is that by using centrifugal force all of the polymer material, on the average, experiences a lower residence time. By decreasing the average residence time of devolatilization for all polymer material, higher devolatilization temperatures may be employed without as much monomer being regenerated as found in conventional devolatilizers. The temperatures for devolatilization in the present apparatus will be in a range of about 180° C. to about 300° C., preferably from about 220° C. to about 260° C. Typically, the residence time for all polymer material in the present apparatus will generally be in a range of about 0.1 to about 10 minutes, preferably from about 0.3 to about 3 minutes.

The centrifugal force may also be sufficient to expel the volatilized polymer liquid product through at least one orifice 33 from the rotatable chamber. The pressure under which the liquid flows through the orifice 33 is dependent upon the centrifugal pressure developed by the rotation of the chamber and depth of the polymer pool. In general, the liquid mixture forms a substantial uniform layer within the peripheral annular portion of the rotatable chamber and the centrifugal pressure (psi) is given by $P=Kn^2d(r_2-r_1)^2$, wherein K is a constant, n is the speed of rotation in rpm, d is the density of the liquid, $r_2$ is the radius of the periphery of the chamber, and $r_1$ is the radius of the interior surface of the liquid. In the event that the chamber is filled with liquid, $r_1$ becomes 0.

It will be noted that to some extent the process is self-regulating in that increasing the radial depth of the polymer pool within the chamber increases centrifugal pressure, and hence the flow from the chamber. For continuous operation of the present apparatus according to the invention, it is obviously not desirable to permit the liquid level to fall so low that the polymer discharge means are exposed to gas or foam, or to rise so high as to occupy the vapor disentrainment subchamber 31.

Centrifugation at an angular velocity which produces centrifugal gravity G in the order of approximately 50 to 2000 times the normal gravitational pull (g) will readily separate gaseous and liquid components in a discontinuous phase from a continuous phase of liquid. When treating a liquid with such centrifugation, the liquid is promptly pulled from the walls and/or interstices of any irregular surfaces, the a substantial amount of volatile that may be present with the liquid is removed and a substantially devolatilized polymer liquid is left in the peripheral annular portion.

The partially devolatilized product is spread as a thin film on the proximal inner surface 35 against which it is radially pulled by centrifugal force. The film thus formed has a greater surface area for the dissipation of gases from the thermoplastic material, and thus provide further devolatilization of the partially devolatilized product.

Thus the partially devolatilized product will be separated according to its two phases, the polymer liquid phase and a volatile phase. The foam and/or the separated gas components of the partially devolatilized product collect in the vapor disentrainment subchamber 31, and the polymer liquid forms in a pool 36 in the peripheral annular subchamber 32.

The vapor and polymer may then be discharged through a vapor discharge means (not shown) and a polymer discharge means, respectively.

The quantity of liquid in the peripheral annular portion is regulated so that it generally occupies the peripheral annular subchamber 32 of the interior of the rotatable chamber. If one considers that during rotation of the rotatable chamber, centrifugal force throws the liquid to the peripheral annular subchamber 32 of the rotatable chamber outside the boundary of line A—A, the boundary may be considered as the level of liquid in the rotatable chamber, referred to as the "gravitational" force due to centrifugation. The vapor disentrainment subchamber 31 is generally the region above the polymer pool 36.

The shape, length, and arrangement of the polymer discharge means about the periphery of the rotatable chamber can be selected to suit a particular liquid composition. A typical polymer discharge means for forming strands may be an aperture, having a diameter from about 6 to about 100 mils and a length of from about 0.01 to about 0.4 inch. A typical polymer discharge means for forming a sheet may be a continuous, annular slit.

The extruded polymer may be collected by doctoring the extrudate with scraping means from the outer surface of the rotatable chamber, and collecting the extrudate in collecting means.

By way of further illustration, an apparatus is constructed generally as depicted in the Figure. A polystyrene solution with entrained and dissolved unreacted styrene monomer greater than 15 percent by weight is run through a heat exchanger at temperatures above about 250° C. The vacuum within the rotatable chamber remains nearly constant at 10 mm Hg. It is noted that the monomer content of the resultant polymer is substantially improved when compared with the monomer content of like compositions devolatilized under similar temperature and pressure in conventional apparatus.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. A method for the devolatilization of the product of a polymerization process containing at least one volatile material, the steps of the method comprising;
    (a) providing a volatile-containing polymerization product, said volatile-containing product being selected from the group consisting of monovinylidene aromatic polymers, polyolefins, vinylidene chloride copolymers, polyphenylene oxides, and blends thereof;
    (b) feeding said product into a heated zone;
    (c) heating said product in a temperature range of about 180° C. to about 300° C., whereby a substantial portion of the volatile material is placed in the vapor phase and the remainder of the volatile material becomes entrapped in the product in a liquid or gas form to form a partially devolatilized product;
    (d) passing the partially devolatilized product into a rotatable chamber, said chamber having an inlet and means for the rotation;
    (e) rotating the rotatable chamber at an angular velocity which produces a centrifugal gravity of between about 50 to about 2000 times the normal gravitational pull (g) to create a centrifugal force sufficient to move the partially devolatilized product along the inner surface of the rotatable chamber, thereby releasing a substantial amount of the volatile from the product to form a volatile vapor and a substantially devolatilized polymer liquid; and
    (f) removing the separated polymer liquid from the rotatable chamber by means for withdrawing the polymer.

2. The method of claim 1 wherein step (d) further comprises partially disengaging the volatiles from the partially devolatilized product prior to entering the chamber.

3. The method of claim 1 wherein the inner surface of the chamber is elongated and defines a peripheral annular portion, whereby the centrifugal force forms a pool of separated polymer in the peripheral annular portion.

4. The method of claim 3 wherein the inner surface of the chamber further defines a centrally disposed feed means, whereby the polymer liquid is pulled as a film along the elongated surface between the feed means and the peripheral annular portion to further devolatilize the product.

5. The method of claim 1 wherein the means for withdrawing the separated polymer liquid comprises at least one polymer discharge aperture in the peripheral annular portion of the rotatable chamber.

6. The method of claim 1 wherein the partially devolatilized product is continously fed into the rotatable chamber and the separated polymer liquid is removed from the chamber at a rate generally equal to the rate of feed into the chamber.

7. The method of claim 4 further comprising after 1(f), the step of collecting the separated polymer liquid in collecting means.

8. The method of claim 1 wherein the rotatable chamber further comprises an evacuation means to emit the volatile vapor from the chamber.

9. The method of claim 1 wherein the monovinylidene aromatic polymers is selected from the group consisting of styrene, styrene-acrylonitrile and styrene-methylacrylate.

10. The method of claim 1 wherein the polyolefins is selected from the group consisting of polyethylene and polypropylene.

* * * * *